June 9, 1942.  G. A. HALFVARSON  2,285,924
SOUND DEADENING MATERIAL AND METHOD
Filed Nov. 12, 1940   2 Sheets-Sheet 1
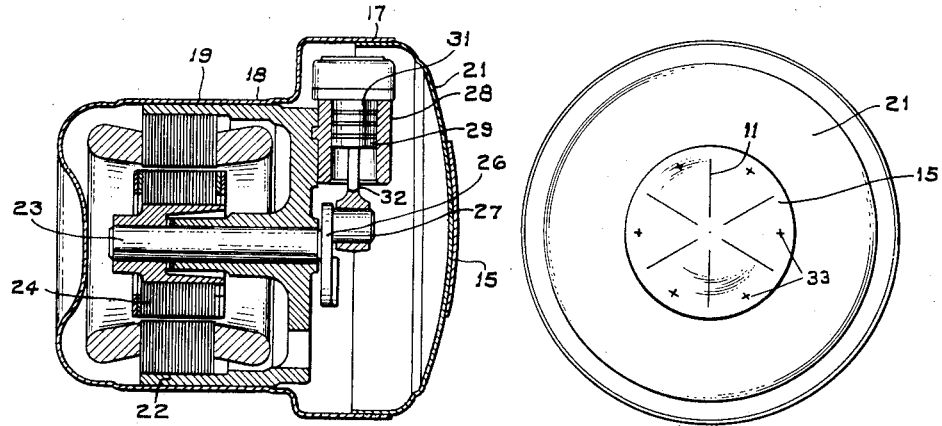
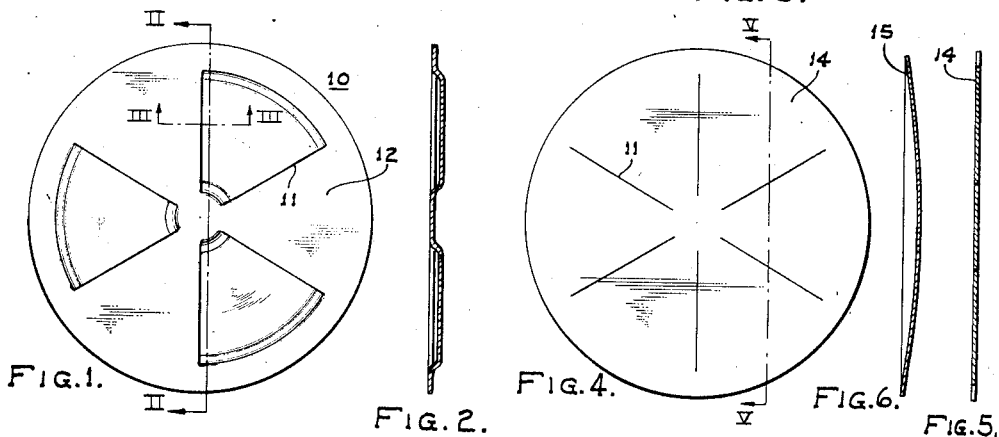
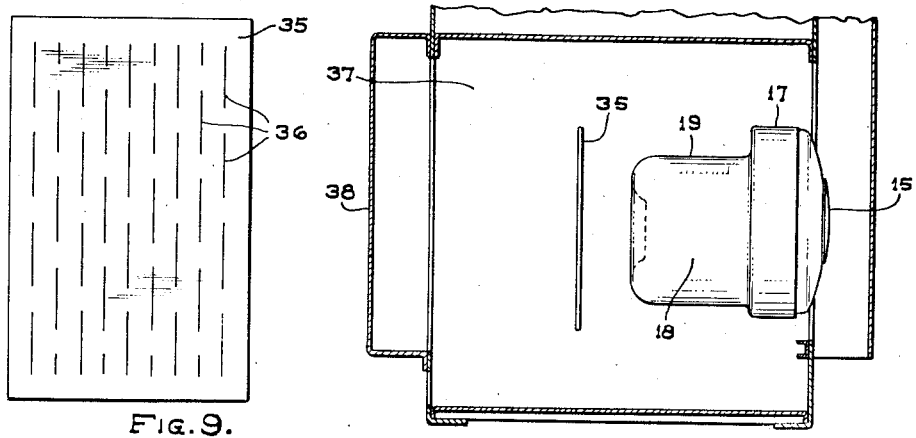
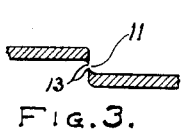
INVENTOR
GUSTAF A. HALFVARSON.
BY *MSteiger*
ATTORNEY June 9, 1942.  G. A. HALFVARSON  2,285,924
SOUND DEADENING MATERIAL AND METHOD
Filed Nov. 12, 1940  2 Sheets-Sheet 2

WITNESSES:

INVENTOR
GUSTAV A. HALFVARSON
BY
ATTORNEY

Patented June 9, 1942

2,285,924

UNITED STATES PATENT OFFICE 2,285,924

SOUND-DEADENING MATERIAL AND METHOD

Gustaf A. Halfvarson, Springfield, Mass., assignor to Westinghouse Electric & Manufacturing Company, East Pittsburgh, Pa., a corporation of Pennsylvania Application November 12, 1940, Serial No. 365,244

9 Claims. (Cl. 189—34)

This invention relates to sound-deadening material and more especially to sound-deadening sheet metal and to a method for fabricating the same.

One object of the invention is to render sound-conducting metals sound deadening.

Another object is to provide sheet metal which absorbs and deadens sounds and similar vibrations.

A further object is to provide a method for fabricating the sound-deadening material of this invention.

These and other objects are effected by my invention as will be apparent from the following description and claims taken in connection with the accompanying drawings, forming a part of this application, in which:

Fig. 1 is a plan view of a metal disc sheared in accordance with the first process step of this invention;

Fig. 2 is a sectional view on the line II—II of Fig. 1;

Fig. 3 is an enlarged sectional view on the line III—III of Fig. 1;

Fig. 4 is a plan view of the metal disc of Fig. 1 after it is flattened according to the second process step of this invention;

Fig. 5 is a section on the line V—V of Fig. 4;

Fig. 6 is a modification and shows a section of the disc of Fig. 1 pressed into a convex configuration;

Fig. 7 is a sectional view of an enclosed motor-compressor unit with the silencing disc of Fig. 6 secured thereto;

Fig. 8 is an end view of the casing of Fig. 7 showing the silencing disc;

Fig. 9 shows a modification of the invention and is a plan view of a flat sheet of metal sound deadened in accordance with the invention;

Fig. 10 is a sectional view of the machine compartment of a domestic refrigerator equipped with the sound-deadening material of this invention;

Figure 11:
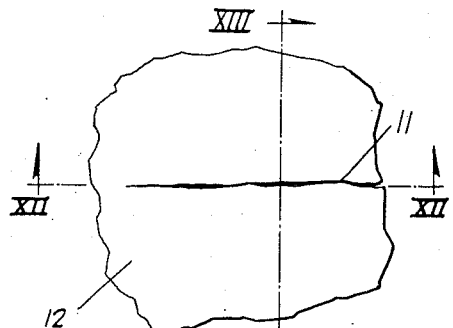
Fig. 11 is an enlarged plan view of a portion of a metal sheet embodying a portion of the slit of this invention.
Figure 12:
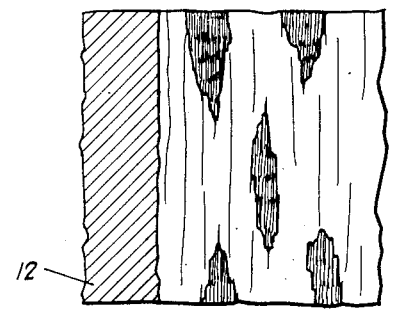
Fig. 12 is a sectional view on the line XII—XII of Fig. 11 showing the roughness of the sheared surface.
Figure 13:
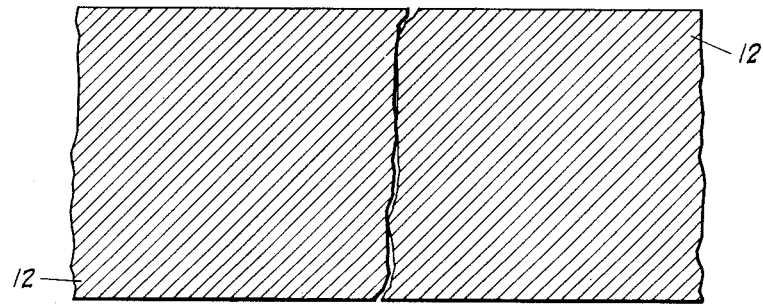
Fig. 13 is a sectional view on the line XIII—XIII of Fig. 11.
Figure 14:
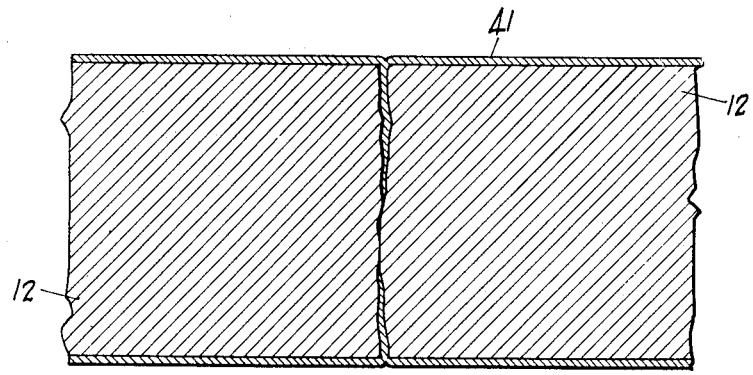
Fig. 14 is a view similar to Fig. 13 but with a different conformation of the slit and with the surface of the sheet and the slit coated with paint.

Referring now to the modifications shown in Figs. 1 to 8, inclusive, the reference numeral 10 designates a sheet metal disc in which six radial blind cuts or slits 11 have been sheared to divide the disc into six panels 12. The shearing of the cuts 11 is preferably performed by a set of dies which shear the six cuts 11 by depressing alternate panels 12 as shown in Figs. 1, 2, and 3, as such dies distort the metal to a minimum. The cutting edges of the die are preferably slightly rough, such as produced by a coarse grinding wheel, so that the sheared edges 11 of the disc 10 are slightly rough. The cooperating shearing edges of the dies furthermore are preferably in loose engagement with one another so that a slight draw or burr 13 is formed on the edges of the cuts 11.

The disc 10 is then flattened as shown at 14 in Figs. 4 and 5 so that the adjacent edges of the various slits 11 are pressed back into substantially their former positions. The flattening process preferably also flattens the burr 13 on the edges of the slits 11 so that the burr 13 is forced partially into the slit 11. The engagement of the edges of each slit 11 is important and should be neither too tight nor too loose, the best engagement being such as to afford a slight interlocking and distortion of the roughness of the cut edges. The best results appear to be achieved if the fit is such that a slight sprinkling of light is visible through the slits when the opposite side of the disc is strongly illuminated.

The disc 10 may also be pressed into a spherical or convex configuration 15 as shown in Fig. 6 in place of a flat disc 14 as shown in Fig. 5, if such shape is desired. The flattened disc 14 and spherical-shaped disc 15 will be found to be sound-deadening, and when struck with a metal object will resound with a dull thud as compared to the metallic ring of a similarly-shaped disc without the slits.

A suitable metal for a disc four inches in diameter is sheet steel twenty-five thousandths of an inch thick and the preferred number of slits in such a disc is six. Zinc coated steel will give better sound-deadening effects than the bare metal. The finished disc may also be painted or varnished with a coating material 41 to increase its sound-deadening effect and flock may be blown on the freshly-painted or varnished surface to still further increase this effect. The coating material may be a non-metallic material which penetrates the slit and hardens into a rigid mass. The arrangement of the slits appears to be immaterial and may be varied to suit the manufacturing conditions and to produce a material of the desired structural strength. The sound-deadening effect appears to be a function of the number of slits per unit of area but little additional benefit is achieved in spacing the slits closer than three-fourths of an inch when sheet steel twenty-five thousandths of an inch thick is used.

The slitted discs 14 or 15 are suitable for silencing noise emanating from machinery and may be formed within limits to fit the machinery to be silenced. Fig. 7 shows the spherical or convex disc 15 applied to the rounded end of the casing 17 of a motor-compressor unit 18 of a domestic refrigerator. The casing 17 has a cup-shaped spherical body portion 19 and a dished end portion 21, and a motor frame 22 is pressed into the body portion 19. An overhanging shaft 23 is journaled centrally in the motor frame 22 and carries a rotor 24 on one of its overhanging ends and a crankshaft 26 with a crank pin 27 on the other overhanging end. A cylinder 28 of a reciprocating compressor pump 29 is secured adjacent the upper portion of the side wall of the motor frame 22 and cooperates with a piston 31 actuated by a rod 32 connecting the pin 27. The piston 31 of the pump 29 reciprocates at a speed of approximately 1750 R. P. M.

The disc 15 is dished to a slightly greater radius than the central area of the end portion 21 of the casing 17 and the edge of the disc is secured closely to the casing by spot welds 33. This construction stresses the disc 15 so that its central portion presses tightly against the casing and avoids rattling or chattering of the central portion of the disc against the casing when the casing vibrates. The tightly-pressed contact of the central portion of the disc against the casing also produces a sound-deadening effect which is believed to be due to friction between the disc and the casing when the casing vibrates at audio-frequencies.

The disc 15 would also be effective in deadening the noise if placed on the interior surface of the end portion 21 of the casing 17 but is not so placed to avoid affording a hiding place for dirt and contamination in the casing 17, which must be guarded against in refrigerant compressor units.

Referring now to the modification shown in Figs. 9 and 10, a rectangular sheet of metal 35 is sheared with rows of overlapping blind cuts 36 and then is pressed into its former flat condition. The cuts 36 are of the same general nature, as are the radial cuts 11 in the discs 14 and 15. The sheet 35, like the discs 14 and 15, will have sound-deadening qualities and may be used as a target to absorb sound vibrations traveling in the air.

Such use is illustrated in Fig. 10 which illustrates the machine compartment 37 of a domestic refrigerator, such as is usually found beneath the refrigerated compartment. The motor-compressor unit 18 is the same as that shown in Fig. 7 and is provided at one end with the silencing disc 15. The other end of the casing is silenced by the target sheet 35 interposed between the body portion 19 of the casing 17 and the front wall 38 of the refrigerator to intercept and deaden the sound waves emanating from the motor-compressor unit 18.

The sound-deadening action of the material of this invention is not fully understood. It is believed, however, that the cuts divide the sheet metal into panels, each of which tends to resonate or vibrate with the sound waves or other vibrations directed towards it either through the medium of the air or through direct contact with the vibrating body. Each of these panels tends to vibrate somewhat differently from the adjacent panels, either because the sound waves do not strike them at the same instant, or because of the inherent small differences in the size of the panels due to manufacturing inaccuracies. This independent vibration of each panel introduces friction at the slits, which friction absorbs and damps the vibrations.

The material is suitable for many purposes. In a refrigerator cabinet it fulfills the function of matted fibrous material, such as Celotex, and is superior thereto in that it occupies less space, is less retarding to the circulation of air, is heat conducting, fireproof, and does not absorb moisture. It also possesses greater strength than the usual sound-deadening materials and may, therefore, be used as a structural material.

It will be obvious from the above that this invention provides a sound-deadening material which has many uses. The invention also provides for a method of fabricating this material.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A sound-deadening material comprising a sheet of metal having a slit therein, the edges of said slit being rough to provide small projections, the projections on opposite sides of said slit being in tight frictional engagement.

2. A sound-deadening material comprising a sheet of metal having a slit therein, the edges of said slit being rough to provide small projections, the projections on opposite sides of said slit being in tight frictional engagement, and a rigid coating material on said metal and penetrating said slit.

3. A sound-deadening material comprising a sheet of metal having a plurality of slits therein, the edges of said slits being rough to provide small projections, the projections on opposite sides of each of said slits being in tight frictional engagement.

4. A sound-deadening material comprising a sheet of metal having a plurality of slits therein, the edges of said slits being rough to provide small projections, the projections on opposite sides of each of said slits being in tight frictional engagement, and a rigid non-metallic coating material on said sheet and penetrating said slits.

5. A sound-deadening material comprising a sheet of metal having slightly rough slits therein, all of the ends of said slits lying within said sheet, the edges of said slits being tightly pressed together, said pressure and roughness being such that rays of light can penetrate through portions of said slits.

6. The method of sound-deadening sheet metal which method comprises shearing a plurality of slits in said metal, all of the ends of said slit lying within said sheet, said slits having slightly rough edges and a slight burr, and bending the edges of said sheared slits to substantially their former positions to afford frictional engagement between the edges of the respective slits.

7. The method of sound-deadening sheet metal which method comprises shearing a slit in said sheet with a slightly rough shearing tool, the ends of said slit lying within the said sheet and restoring the cut edges of the slit to approximately their former position to afford tight engagement of the edges of the slit with one another.

8. The method of sound-deadening sheet metal which method comprises shearing a slit in said sheet with a slightly rough shearing tool, the ends of said slit lying within said sheet, restoring the cut edges of the slit to approximately their former position to afford tight engagement at the projections of the cut surface, and thereafter applying a non-metallic coating to said sheet which penetrates said slit and hardens into a rigid mass.

9. The method of damping vibrations of audio frequency emanating from an article, said article providing attachment areas, which method comprises forming a sheet of metal to afford contiguous panels; disposing the edges of said panels in frictional, vibration damping engagement with one another, said sheet also having attachment areas; forming at least some of the portions of said sheet between the attachment areas thereon so that said portions are stressed to press against said article when said attachment areas of said sheet are attached to the attachment areas of said article; and attaching said attachment areas of said sheet to the attachment areas of said article.

GUSTAF A. HALFVARSON.